(12) United States Patent
Kamikubo

(10) Patent No.: US 6,259,547 B1
(45) Date of Patent: *Jul. 10, 2001

(54) SCANNING OPTICAL SYSTEM

(75) Inventor: Junji Kamikubo, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/553,281

(22) Filed: Apr. 20, 2000

Related U.S. Application Data

(63) Continuation of application No. 08/997,946, filed on Dec. 24, 1997, now Pat. No. 6,124,962.

(30) Foreign Application Priority Data

Dec. 27, 1996 (JP) .................................................. 8-357490

(51) Int. Cl.⁷ .................................................. G02B 26/08
(52) U.S. Cl. ............................ 359/205; 359/207; 359/19
(58) Field of Search ..................................... 359/205–207, 359/216–219, 17–19, 565, 568–570, 662, 708–712, 717–718; 235/457

(56) References Cited

U.S. PATENT DOCUMENTS

| | | |
|---|---|---|
| 5,208,701 | 5/1993 | Maeda . |
| 5,646,767 | 7/1997 | Iima et al. . |
| 5,748,354 | 5/1998 | Iizuka . |
| 5,838,480 | 11/1998 | McIntyre et al. . |
| 6,124,962 * | 9/2000 | Kamikubo ........................... 359/205 |

OTHER PUBLICATIONS

Diffractive Optics at Eastman Kodak Company, SPIE, vol. 2689, pp. 228–254.

* cited by examiner

Primary Examiner—James Phan
(74) Attorney, Agent, or Firm—Greenblum & Bernstein, P.L.C.

(57) ABSTRACT

Disclosed is a scanning optical system, which is provided with a light source, a deflector, which deflects a beam emitted from said light source, and a scanning lens for converging the beam deflected by said deflector onto a surface to be scanned. The scanning lens has a positive power as a whole, and includes a plurality of refraction lens elements. Further, a diffraction lens structure is formed on at least one surface of one of the plurality of lens elements. Combination of the refraction lens elements and the diffraction lens structure compensates a lateral chromatic aberration caused by the refraction lens elements.

11 Claims, 4 Drawing Sheets

SCANNING OPTICAL SYSTEM

This is a continuation of U.S. patent application Ser. No. 08/997,946, filed Dec. 24, 1997, U.S. Pat. No. 6,124,962, the contents of which are expressly incorporated by reference herein in its entirety.

BACKGROUND OF THE INVENTION

The present invention relates to a scanning optical system which is used as an optical system for a scanning optical device such as a laser beam printer.

The scanning optical device deflects beams by means of, for example, a polygonal mirror emitted from a light source such as a laser diode, and converges the beam to form a spot on a surface to be scanned such as a surface of a photoconductive drum, through an fθ lens (scanning lens). The beam spot formed on the surface to be scanned moves (i.e., scans) on the surface in a predetermined scanning direction as the polygonal mirror rotates. In this specification, the direction in which the beam spot scans is referred to as a main scanning direction. Further, a plane including the scanning beam scanning in the main scanning direction is referred to as a main scanning plane. Furthermore, a direction perpendicular to the main scanning plane is referred to as an auxiliary scanning direction.

The fθ lens consists of a single lens element or a plurality of lens elements, and various types of aberrations are corrected such that the spot on the surface to be scanned scans linearly in the main scanning direction, at a constant speed on the surface to be scanned as the polygon mirror rotates at a constant rotation speed.

Recently, in order to increase an image forming speed, there has been developed a multi-beam scanning device which is provided with a plurality of light sources, such as laser diodes. The plurality of laser diodes emit a plurality of beams to form a plurality of scanning lines simultaneously. In a scanning optical system employed in such a multi-beam scanning device, positional relationship between the scanning lines formed by the plurality of scanning beams should be adjusted accurately such that a plurality of scanning lines are apart from each other by a predetermined distance.

In such a multi-beam scanning device, generally, wavelengths of the beams emitted by the plurality of laser diodes distribute, for example, within a range of (a standard designed value ±15) nm. Therefore the wavelengths of two laser diodes forming the adjacent scanning lines may be different by 30 nm at the maximum. If the fθ lens has a lateral chromatic aberration, a write start position along the main scanning direction, from which the scanning beam spot contributes to image formation, and a write complete position, which is the end of the image portion on the scanning line, may differ between a plurality of lines, which may exceed an allowable range, and affects the quality of formed image.

Conventionally, the chromatic aberration of the fθ lens is compensated by combining a positive lens and a negative lens having different dispersion. Alternatively, the effect of the chromatic aberration due to variation of wavelengths emitted by the respective laser diodes may be reduced by selecting laser diodes which emit laser beams having closer wavelengths, i.e., the wavelengths emitted by the laser diodes distribute within a smaller range.

In order to correct the chromatic aberration of the fθ lens by selecting a lens materials (glass materials) having different dispersion as in the prior art described above, the number of lens elements of the fθ lens increases when compared with a case where the chromatic aberration is not corrected. In addition, in order to compensate for the chromatic aberration, lens materials cannot be selected only by their refractive indexes, and types of available lens materials are limited, thereby degree of freedom in designing the lens is lowered. On the other hand, when light sources are used after selected by differences of their emission wavelengths, the selection operation itself takes much time, and measures cannot be taken when there arises difference in the emission wavelength due to variation in used periods of the light sources.

SUMMARY OF THE INVENTION

It is therefore an object of the invention to provide an improved scanning optical system whose lateral chromatic aberration is compensated so that deterioration in image forming characteristics due to uneven wavelengths emitted by a plurality of laser diodes is avoidable without increasing the number of lens elements. For the above object, according to the invention, there is provided an improved scanning optical system, comprising: a light source; a deflector, which deflects a beam emitted from the light source; and a scanning lens for converging the beam deflected by the deflector onto a surface to be scanned, wherein the scanning lens has a positive power, the scanning lens consisting of a plurality of refraction lens elements, a diffraction lens structure being formed on at least one surface of one of the plurality of lens elements, the diffraction lens structure compensating a lateral chromatic aberration caused by the refraction lens elements.

As above, according to the present invention, the chromatic aberration caused by the refraction lens elements can be cancelled without increasing the number of lenses.

Optionally, the light source emits a plurality of beams which are to be converged on different positions on the surface to be scanned, the deflector deflect all of the plurality of beams. When a plurality of laser diodes are used to emit the plurality of beams simultaneously, wavelengths of the beams may be different from each other. Even in such a case, since the chromatic aberration is compensated, the optical system can be used for above-described multi-beam emitting device, and image forming operation can be performed at high accuracy.

It is preferable, that the diffraction lens structure may have circular zones concentric about an optical axis of the diffraction lens structure.

Preferably, the diffraction lens structure may be formed on a rotationally symmetrical lens surface of the scanning lens. In view of processing a mold, if the diffraction lens structure is formed on the rotation-symmetrical surface of the refraction lens, it is relatively easy to process.

It is further preferable that the diffraction lens structure may be formed on a surface of the plurality of refraction lens elements closest to the deflector.

According to another aspect of the invention, there is provided a scanning lens having a positive power, the scanning lens consisting of a plurality of refraction lens elements, a diffraction lens structure being formed on at least one surface of the plurality of refraction lens elements, the diffraction lens structure compensating a lateral chromatic aberration caused by the plurality of refraction lens elements.

BRIEF DESCRIPTION OF THE DRAWINGS

FIGS. 4A–4C show aberration characteristics of the optical system of the embodiment, wherein FIG. 4A shows linearity errors, FIG. 4B shows a curvature of field, and FIG. 4C shows a curvature of scanning line.

DETAILED DESCRIPTION OF THE PREFERRED EMBODIMENTS

An optical scanning system provided with a diffraction lens structure according to an embodiment of the invention will be described with reference to the accompanying drawings.

Figure 1:
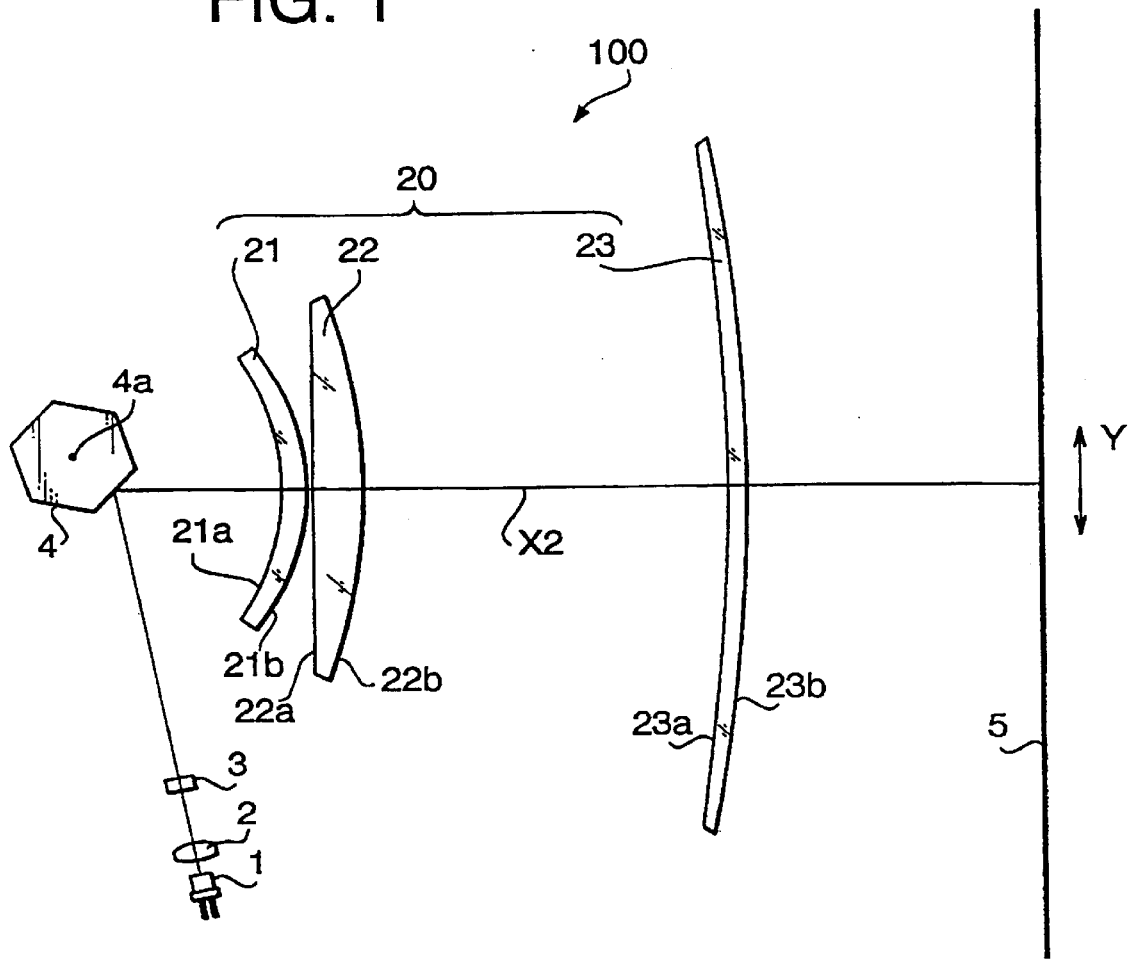
FIG. 1 is a diagram showing an arrangement of optical elements of a scanning optical system, viewed from a direction perpendicular to a main scanning direction, according to an embodiment of the present invention.
Figure 2:
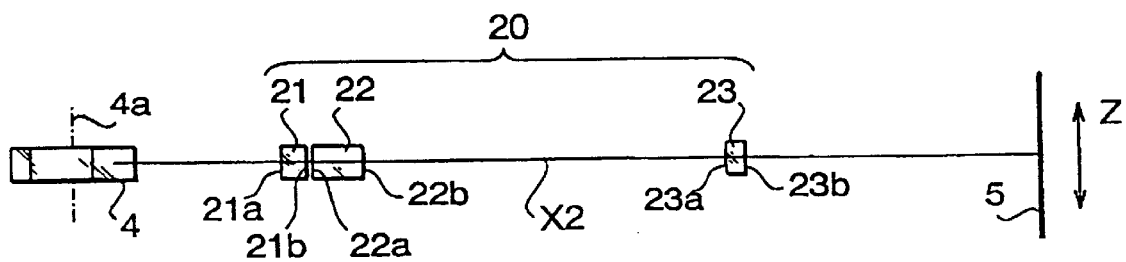
FIG. 2 is a diagram showing the arrangement of the optical elements of FIG. 1 viewed from a direction perpendicular to an auxiliary scanning direction.

FIG. 1 is a diagram illustrating a scanning optical system 100 according to a first embodiment of the invention, viewed from a direction perpendicular to a main scanning direction (indicated by arrow Y in FIG. 1), and parallel to an auxiliary scanning direction (indicated by arrow Z in FIG. 2). In other words, a surface of FIG. 1 coincides with the main scanning plane. FIG. 2 is a diagram of the scanning optical system shown in FIG. 1, viewed from a direction perpendicular to the auxiliary scanning direction Z, and parallel to the main scanning direction Y.

The scanning optical system 100 has a light source 1. The light source 1 emits a plurality of laser beams, which are parallel to each other, and arranged in the auxiliary scanning direction. Laser beams emitted from the light source 1 are collimated into parallel beams by a collimate lens 2, and projected, along an optical axis X1, onto a polygon mirror (deflector) 4 through a cylindrical lens 3 having a positive power only in the auxiliary scanning direction Z. Therefore, the parallel beams are converged in the auxiliary scanning direction to form linearly extending images on a plane closely adjacent to light reflection surfaces of the polygon mirror 4. The polygon mirror 4 is driven to rotate about a rotating axis 4a. The laser beams incident on the polygon mirror 4 are deflected by the reflection surfaces of the polygon mirror 4, and beam spots are formed on a surface to be scanned 5 through an fθ lens 20. The fθ lens 20 has three lens element 21, 22, and 23 as shown in FIGS. 1 and 2.

It should be noted that, the above-described scanning optical system 100 is a multi-beam scanning optical system, and the light source 1 may be a multi-point emission laser diode. Alternatively, beams from a plurality of different laser diodes are combined with use of a beam composing element such as a beam splitter. In such cases, spots corresponding to the plurality of beams should be arranged on the surface to be scanned 5 such that the spots are spaced apart, in the auxiliary scanning direction, by a predetermined distance. Thus, a plurality of scanning lines are formed at one scanning. Further alternatively, the light source 1 could be a single laser diode emitting a single laser beam.

The fθ lens 20 forms a substantially circular spot on the surface to be scanned 5. Thus, positional errors of scanning lines due to a tilt error of the reflection surfaces of the polygon mirror 4 can be reduced by making the reflection surfaces of the polygon mirror 4 and the surface to be scanned 5 (i.e., an image plane) to be substantially conjugate in the auxiliary scanning direction.

The fθ lens 20 consists of three lens elements, which are:

the first meniscus lens 21 having a positive power in both the main scanning and auxiliary scanning directions;

the second convexo-plane lens 22 having a positive power in both the main scanning and auxiliary scanning directions; and the third elongated lens 23 elongated in the main scanning direction, and having a positive power substantially only in the auxiliary scanning direction, in this order along the direction from the polygon mirror 4 to the surface to be scanned 5. The first and second lenses 21 and 22 are located at positions close to the polygon mirror 4, and the third lens 23 is positioned close to the surface to be scanned 5.

The polygon mirror side surface 21a of the first lens 21 is formed with a diffraction lens structure which is a surface relief type diffraction lens structure. The surface 21a is formed such that, on a rotation-symmetrical aspherical surface which serves as a base curve, the diffraction lens structure is formed to compensate the lateral chromatic aberration caused by all of the refraction lenses. It is preferable that the lens surface 21a to which the diffraction lens structure is formed is as close to the polygon mirror 4 as possible, and is a rotation-symmetric surface. It is because, on the lens surface close to the surface to be scanned 5, the diameter of the beam passing therethrough is reduced. Therefore, condition of beam is significantly affected and changed by the stepped portions when it passes therethrough. In addition, in view of facility in processing a mold, it is advantageous to form the diffraction lens structure on the rotation-symmetrical base curve. The other lens surface 21b of the first lens 21 is a rotation-symmetrical aspherical surface.

The second lens 22 has a lens surface 22a which has a flat surface on the polygon mirror side, and a lens surface 22b, which is a convex surface, on the scanned surface side.

The third lens 23 has a polygon mirror side surface 23a which has a modified toric surface defined as a non-arc curve on the main scanning plane being rotated about an axis which is perpendicular to the optical axis and included in the main scanning plane. The third lens 23 has a convex spherical surface 23b on the scanned surface side.

The following Table 1 shows the lens arrangement of the scanning optical system 100 on the scanned surface side with respect to the cylindrical lens 3. Symbol ry in the table represents a radius of curvature in the main scanning direction, rz is a radius of curvature in the auxiliary scanning direction (which will omitted if a surface is a rotation-symmetric surface), d is a distance between surfaces along the optical axis, n is a refraction index at the design wavelength, i.e., 780 nm.

In Table 1, surface numbers 1 and 2 define the cylindrical lens 3, surface numbers 3 represents the light reflection surface of the polygon mirror 4, surface numbers 4 and 5 define the first lens 21, surface numbers 6 and 7 define the second lens 22, and surface numbers 8 and 9 represent the third lens 23.

TABLE 1 f = 200.0 mm    Scanning width = 300 mm    Field angle = 43.0°
Design wavelength = 780 nm

| Surface No. | ry | rz | d | n |
|---|---|---|---|---|
| 1 | ∞ | 50.000 | 4.000 | 1.51072 |
| 2 | ∞ | — | 94.500 | |
| 3 | ∞ | — | 50.000 | |
| 4 | −111.618 | — | 7.000 | 1.48617 |
| 5 | −97.061 | — | 2.000 | |
| 6 | ∞ | — | 15.000 | 1.76591 |
| 7 | −193.160 | — | 110.000 | |
| 8 | −663.528 | 32.298 | 5.000 | 1.48617 |
| 9 | −672.444 | — | 88.120 | |

The base curve of the first surface 21a, and the second surface 21b, which are aspherical and rotation-symmetrical about the optical axis, can be expressed by the following equation:

$$X = Ch^2/(1+\sqrt{1-(1+K)C^2h^2}) + A4h^4 + A6h^6 + A8h^8 \quad (1)$$

where,

X is a sag amount, i.e., a distance at a point on the aspherical surface with respect to a tangential plane at a point where the optical axis intersects the aspherical surface;

h is a distance of the point with respect to the optical axis;

C is the curvature (1/r) of the aspherical surface on the optical axis;

K is a conical coefficient; and

A4, A6, and A8 are fourth, sixth, and eighth aspherical surface coefficients, respectively.

It should be noted that the distance h is calculated in accordance with the following equation (2).

$$h = \sqrt{Y^2 + Z^2} \quad (2)$$

where, Y represents a distance from the optical axis in the main scanning direction, and Z represents a distance from the optical axis in the auxiliary scanning direction.

In addition, the non-arc curve, in the main scanning plane, of the lens surface 23a, which is a modified toric surface rotation-asymmetric with respect to the optical axis, can be defined by the equation (3).

$$X = CY^2/(1+\sqrt{1-(1+K)C^2Y^2}) + A4Y^4 + A6Y^6A + 8Y^8 \quad (3)$$

where,

X is a sag amount, i.e., a distance corresponding to a point on the non-arc curve with respect to a tangential line at a point where the optical axis intersects the non-arc curve;

Y is a distance, in the main scanning direction, of the point with respect to the optical axis;

C is the curvature (1/r) of non-arc curve on the optical axis;

K is a conical coefficient; and

A4, A6, and A8 are fourth, sixth, and eighth aspherical surface coefficients, respectively.

The lens surface 23a is defined as a locus when the non-arc curve defined by the above equation (3) is rotated about an axis which is perpendicular to the optical axis and is located on the main scanning plane, by 32.298 mm apart from a point where the optical axis intersects the non-arc curve.

It should be noted that the radius of curvature of each of the aspherical surfaces and the modified toric surface indicated in Table 1 is a radius of each of optical elements on the optical axis, and the conical coefficients, aspherical surface coefficients, and non-arc curve coefficients for respective surfaces are indicated in Table 2.

TABLE 2

| Surface No. | K | A4 | A6 | A8 |
|---|---|---|---|---|
| 4 | 2.80 | −1.304×10⁻⁶ | 3.390×10⁻¹⁰ | 1.732×10⁻¹⁴ |
| 5 | 0.80 | −9.924×10⁻⁷ | 1.078×10⁻¹⁰ | 3.297×10⁻¹⁴ |
| 8 | 0.00 | 8.526×10⁻⁹ | 3.920×10⁻¹³ | −2.517×10⁻¹⁷ |

The shape of the diffraction lens surface 21a (Surface No. 4) of the first lens 21 can be expressed by two components, i.e., a macroscopic base shape as a refraction lens surface (rotation-symmetrical spherical surface described above), and a continuous additional amount Δφ (h) for optical path length which is realized by the diffraction lens structure.

A diffraction lens can be regarded as an equivalence to a refraction lens having a negative Abbe's number in view of its chromatic aberration correction effect. Thus, when the diffraction lens is used together with refraction lenses, the chromatic aberration can be compensated. Dispersion of the diffraction lens has a value outside a range which lens material for the refraction lens can have. In other words, the Abbe's number of the diffraction lens structure has a negative value closer to 0, it is possible to sufficiently correct the chromatic aberration even though the diffraction lens has a relatively low power.

The continuous additional amount Δφ (h) for optical path length is defined as indicated in Table 3 with respect to a point at height h from the optical axis. In this example, the diffraction lens alone has a focal length of 2662.2 mm at the design wavelength of 780 nm.

TABLE 3

| h | Δφ(h) | h | Δφ(h) | h | Δφ(h) |
|---|---|---|---|---|---|
| 1.000 | −0.171 | 15.000 | −40.506 | 29.000 | −173.952 |
| 2.000 | −0.685 | 16.000 | −46.405 | 30.000 | −188.814 |
| 3.000 | −1.544 | 17.000 | −52.771 | 31.000 | −204.653 |
| 4.000 | −2.749 | 18.000 | −59.622 | 32.000 | −221.554 |
| 5.000 | −4.304 | 19.000 | −66.977 | 33.000 | −239.613 |
| 6.000 | −6.213 | 20.000 | −74.856 | 34.000 | −258.944 |
| 7.000 | −8.481 | 21.000 | −83.281 | 35.000 | −279.678 |
| 8.000 | −11.114 | 22.000 | −92.277 | 36.000 | −301.971 |
| 9.000 | −14.121 | 23.000 | −101.872 | 37.000 | −326.005 |
| 10.000 | −17.507 | 24.000 | −112.094 | 38.000 | −351.995 |
| 11.000 | −21.284 | 25.000 | −122.978 | 39.000 | −380.196 |
| 12.000 | −25.460 | 26.000 | −134.561 | 40.000 | −410.912 |
| 13.000 | −30.047 | 27.000 | −146.884 | 41.000 | −444.504 |
| 14.000 | −35.058 | 28.000 | −159.997 | 42.000 | −481.407 |

Actual additional amount to be added by the diffraction lens structure is determined in a manner such that the additional amount has a predetermined initial value (value of a constant CCC, described later) at a height h where the continuous additional amount Δφ (h) becomes integer multiple of wavelength. Therefore, an actual diffraction lens surface has a plurality of circular zones, a step in the optical axis direction being formed at each boundary between the circular zones. The height (i.e., a length in the direction of the optical axis) of the step is determined based on the order of the diffracted light and the wavelength the light to be used.

Intermittent additional amount Δφ' (h) for the optical path length representing an actual microscopic shape of diffraction lens structure is expressed by the following equation (4), in which components corresponding to the integer multiple of wavelength is subtracted from the continuous additional amount Δϕ (h). The wavelength λ is a unit of the intermittent additional amount Δϕ' (h) and the continuous additional amount Δϕ (h).

$$\Delta\phi'(h) = (\text{MOD}(\Delta\phi(h) + \text{CCC}, \pm 1) - \text{CCC}) \quad (4)$$

where,

MOD (k, n) is a function representing a remainder when k is divide by n;

CCC is a constant for determining a phase of boundaries between circular zones (0 ≤ CCC < 1); and λ is the wavelength used. The sign of the divisor ±1 of the function MOD coincides with the sign of the dividend (Δϕ (h)+CCC). Height h satisfying (MOD(Δϕ (h)+ CCC, ±1)=0 represents the height, from the optical axis, of each boundary between the circular zones. The inclination of each circular zone and the height of each step are determined such that the intermittent additional amount Δϕ' (h) is added on the base shape of the lens.

Figure 3:
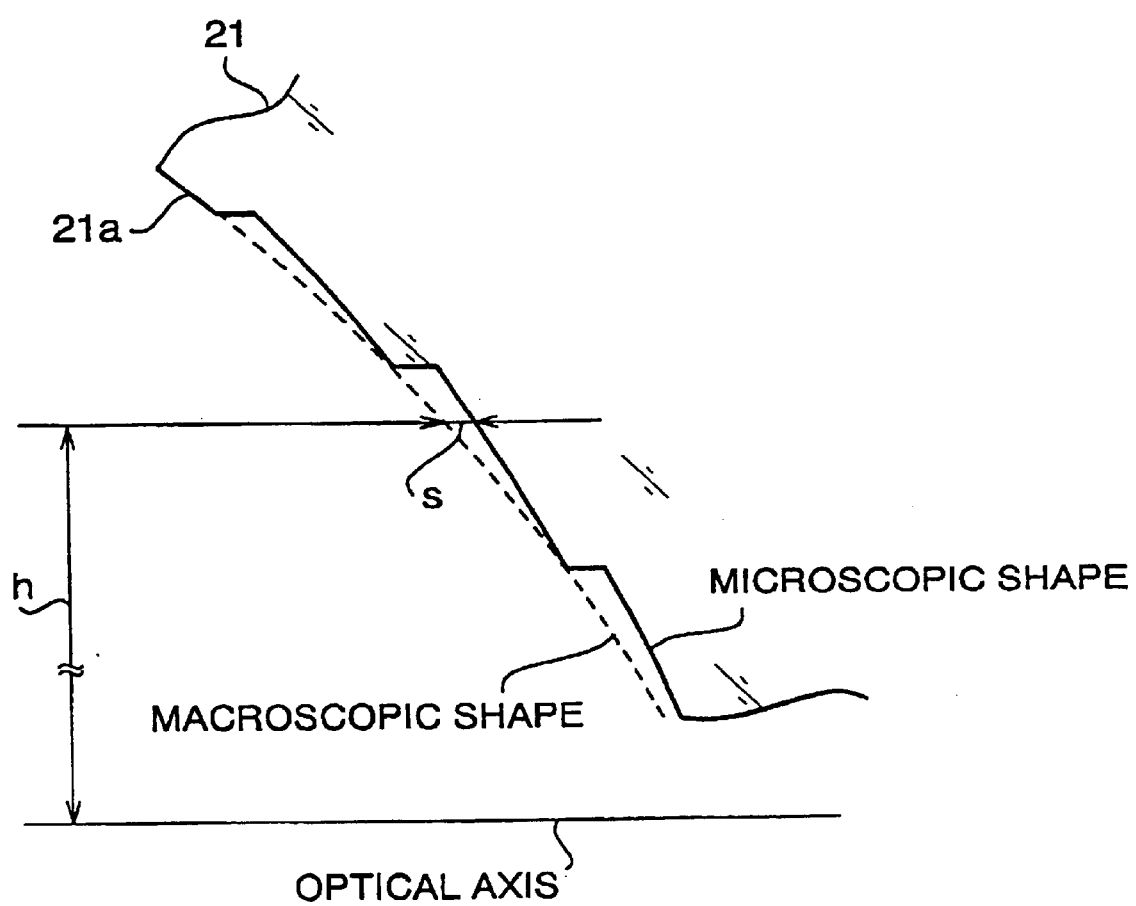
FIG. 3 is a diagram showing a macroscopic and microscopic shapes of a surface on which a diffraction lens structure is formed.

FIG. 3 is an enlarged cross sectional view showing the microscopic shape of the diffraction lens structure. The intermittent additional amount is added onto a base curve representing a refraction lens surface, indicated by a broken line to form the shape indicated by solid lines. Note that the macroscopic shape corresponds to the base curve, and the microscopic shape is the same as the shape indicated by solid line. The step height S between the base curve and the microscopic shape at the height h from the optical axis can be calculated by dividing the optical path additional amount Δϕ' (h) with the difference of refractive indexes of lens and air.

For example, at a position where h=17.000 mm, in accordance with Table 3, the continuous additional amount Δϕ (17.000)=−52.771. If the constant CCC=0, the optical path additional amount (i.e., the microscopic shape) Δϕ' (17.000) can be calculated as follows in accordance with the above equation (4).

$$\Delta\phi'(17.000) = (\text{MOD} (-52.771+0, -1)-0)$$

$$= -0.771$$

Therefore, the step height S (unit: mm) at this position (i.e., at the height h=17.000) can be calculated as follows.

$$S = |\Delta\phi'(h) \cdot \lambda / (n-1)| = 0.771 \times 0.00078 / (1.48617-1)$$

$$= 0.00124 \text{ (mm)}$$

Table 3 shows only the additional amount Δϕ (h) at a position where the height h is an integer. However, since the additional amount continuously changes in accordance with variation of the height h, the additional amount Δϕ (h) is uniquely determined for each height h over the entire area where the diffraction lens structure is formed.

Figure 4C:
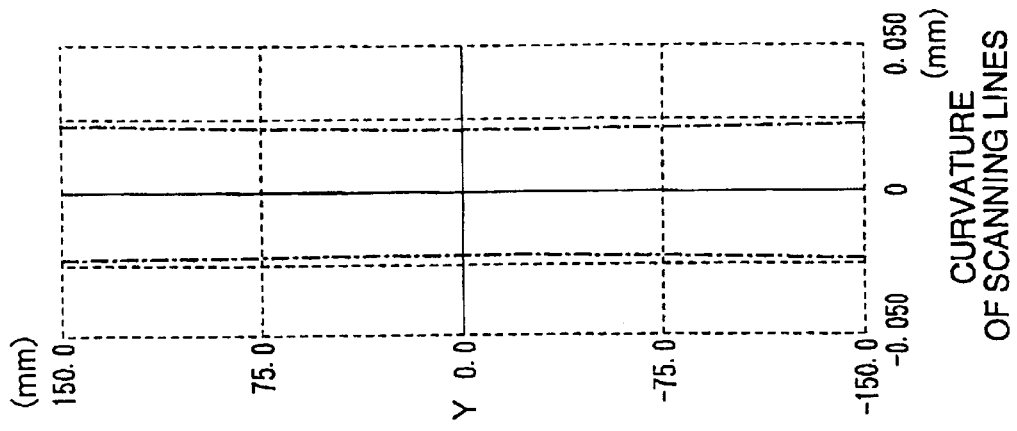
Figure 4B:
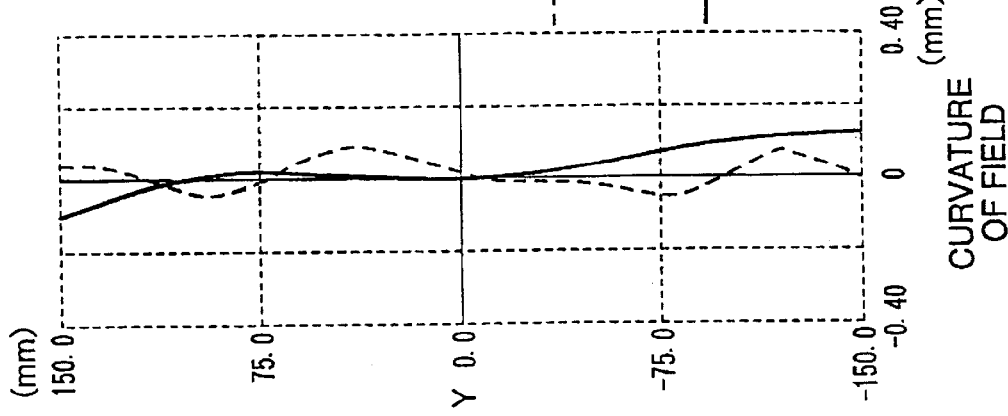
Figure 4A:
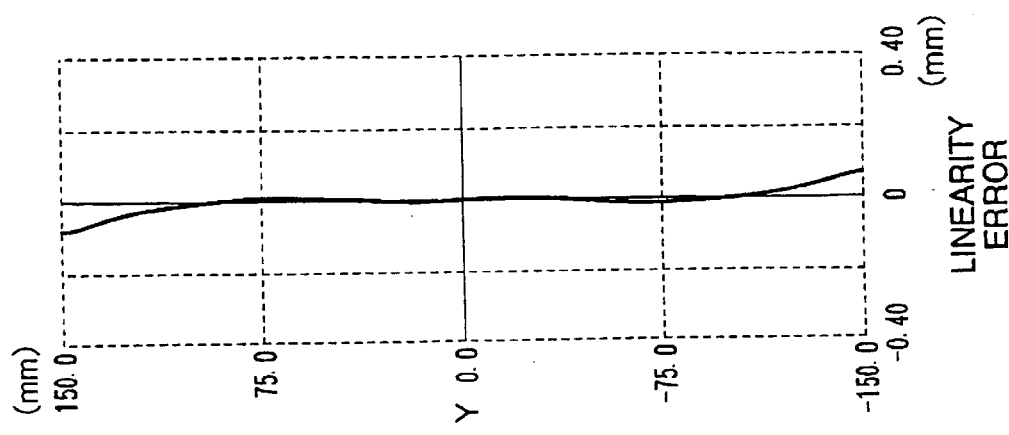

FIGS. 4A–4C show aberration diagrams of the optical system according to the embodiment, wherein FIG. 4A shows linearity errors, FIG. 4B shows curvature of field (broken line: in the main scanning direction; and solid line: in the auxiliary direction), and FIG. 4C represents curvature of scanning line in the auxiliary scanning direction. The curvature of scanning line in the auxiliary scanning direction is expressed as a difference between a scanning line crossing the optical axis and each of two scanning lines vertically separated in the auxiliary scanning direction with respect to the optical axis. The axis of ordinate of each graph represents an image height (height of scanning spot on the surface to be scanned 5 from a point where the optical axis intersects the surface to be scanned 5), the axis of abscissa represents amount of each aberration, and the unit is millimeter for both axes.

Figure 5:
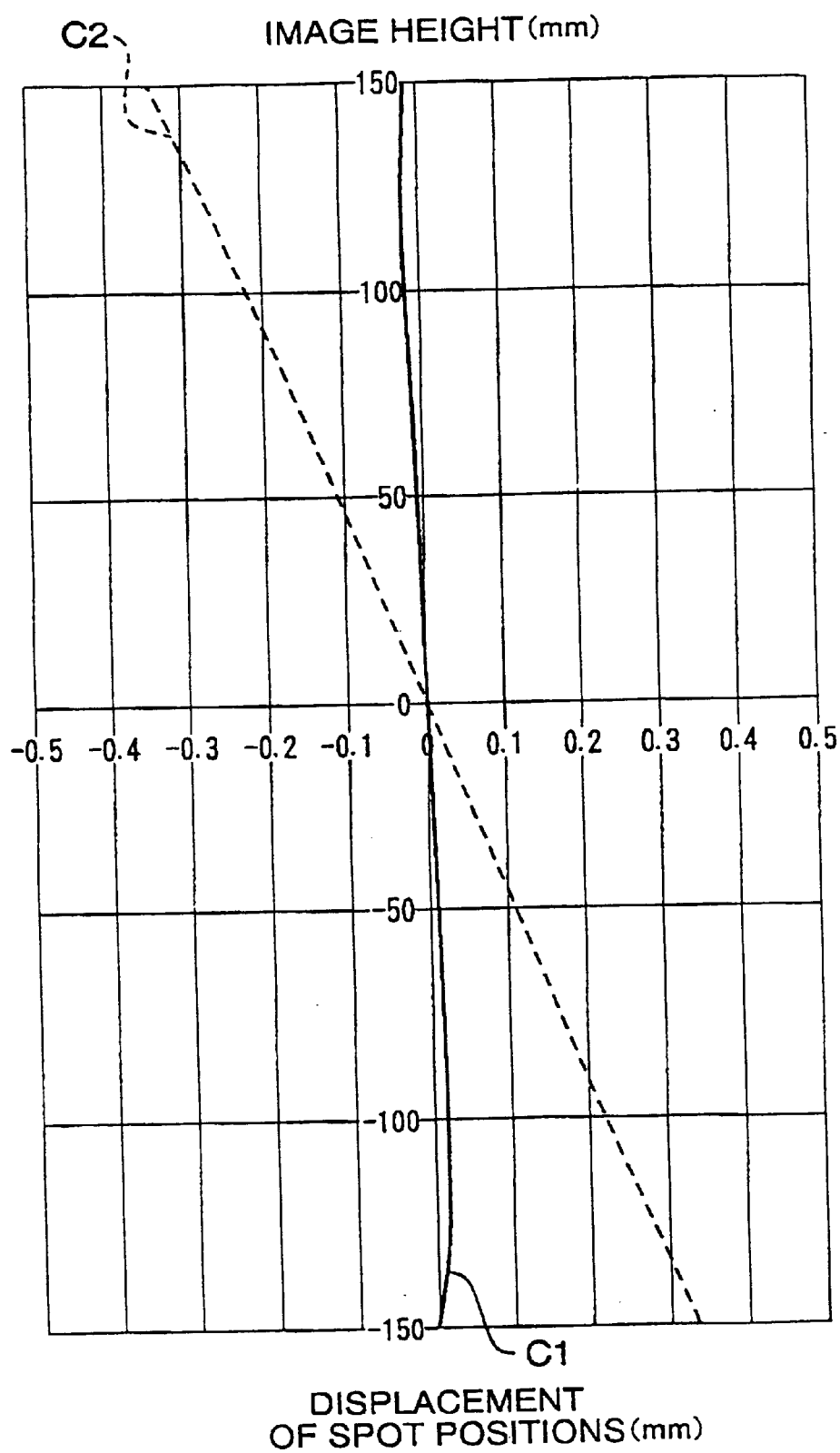
FIG. 5 is a graph showing displacement of spot positions due to variation of wavelengths when an optical system having a diffraction lens structure, and when an optical system having the similar structure but not provided with the diffraction lens structure.

FIG. 5 is a graph comparing characteristic C1 of the scanning optical system of the embodiment utilizing a scanning lens formed with a diffraction lens structure, and characteristic C2 of a comparative scanning optical system which is similar to the above-described embodiment except that the diffraction lens structure is not provided. Both optical systems are designed for a design wavelength of 780 nm. There is no difference in performance between the scanning optical systems when a light source emits the beam having the design wavelength. The graph shows displacement of spot position in the main scanning direction when there is an error of ±15 nm to the design wavelength 780 nm. That is, the axis of ordinate represents the image height and the axis of abscissa represents displacement. Each graph plots errors of image height when the beam having the wavelength of 765 nm is incident on the scanning optical system with respect to the image height when the beam having the wavelength of 795 nm is incident on the scanning optical system.

In the comparative optical system in which the lateral chromatic aberration is not well compensated, as shown by the broken line, variation in the scanning position is greater for the greater image height. On the other hand, in the optical system according to the embodiment (solid line), since the lateral chromatic aberration is compensated, variation of spot position is suppressed at a relatively low level as shown by the solid line in the drawing even for a relatively greater image height is greater.

Although the diffraction lens structure is provided on the first surface of the first lens in the above-described embodiment, it may be provided on a flat plane such as the first surface of the second lens, or another surface of another lens. Alternatively or optionally, a planar element provided with the diffraction lens structure may be added to a scanning optical surface whose chromatic aberration is not corrected. In such a case, the chromatic aberration of the conventional scanning optical system can be compensated easily.

Furthermore, since the chromatic aberration causes a problem not only in the image forming optical system as described above, but also in an image reading optical system using, for example, a white light for illuminating an object. The scanning lens according to the embodiment may also be applied to such an image reading optical system. When the scanning optical system is used in the image reading optical system, light from an object to be read is incident onto a deflector such as a polygon mirror through a scanning lens. Then the light deflected by the deflector is incident on a light receiving device such as a photo diode. In such an arrangement, similarly to the embodiment, the diffraction lens structure formed on at least one surface compensates for the lateral chromatic aberration caused by the refraction lens elements of the scanning lens.

As described above, according to the present invention, since there the lateral chromatic aberration of a refraction lens is compensated by a diffraction lens which is formed on at least one surface of the scanning lens constituting a scanning optical system, it is possible to use a scanning lens for a single beam without increasing the number of lens elements, and to avoid deterioration of image forming capability due to variation of wavelengths emitted, for example, by a plurality of laser diodes.

The present disclosure relates to subject matter contained in Japanese Patent Application No. HEI 08-357490, filed on Dec. 27, 1996, which is expressly incorporated herein by reference in its entirety.

What is claimed is:

1. A scanning optical system, comprising:

a light source;

a deflector that deflects a beam emitted from said light source; and a scanning lens that converges said beam deflected by said deflector onto a surface to be scanned, said scanning lens having a positive power and at least one refraction lens element, a diffraction lens structure being formed on at least one surface of one of said at least one refraction lens element, said diffraction lens structure compensating a lateral chromatic aberration caused by said at least one refraction lens element, said scanning lens includes at least one non-cylindrical anamorphic surface.

2. The scanning optical system according to claim 1, wherein said light source emits a plurality of beams which are converged on different positions on said surface to be scanned, said deflector deflecting all of said plurality of beams.

3. The scanning optical system according to claim 1, wherein said diffraction lens structure has circular zones concentric about an optical axis of said diffraction lens structure.

4. The scanning optical system according to claim 1, wherein said diffraction lens structure is formed on a rotationally symmetrical lens surface of said scanning lens.

5. The scanning optical system according to claim 1, wherein said diffraction lens structure is formed on a surface of said at least one refraction lens element closest to said deflector.

6. The scanning optical system of claim 1, said lateral chromatic aberration being compensated within a range of approximately minus 15 nm to approximately plus 15 nm with respect to a design wavelength.

7. A scanning optical system, comprising:

a scanning lens that has a positive power and at least one refraction lens element, a diffraction lens structure being formed on at least one surface of said at least one refraction lens element, said diffraction lens structure compensating a lateral chromatic aberration caused by said at least one refraction lens element, said scanning lens having at least one non-cylindrical anamorphic surface.

8. The scanning optical system of claim 7, wherein said diffraction lens structure has circular zones concentric about an optical axis of said diffractions lens structure.

9. The scanning optical system of claim 7, further comprising a deflector that deflects a beam of light towards said scanning lens, said diffraction lens structure being formed on a surface of said at least one refraction lens element closest to said deflector.

10. The scanning lens of claim 9, wherein said diffraction lens structure has circular zones concentric about an optical axis of said diffraction lens structure.

11. The scanning optical system of claim 7, said diffraction lens structure compensating said lateral chromatic aberration within a range of approximately minus 15 nm to approximately plus 15 nm with respect to a design wavelength.

* * * * *